INVENTOR.
DEREK WOOD

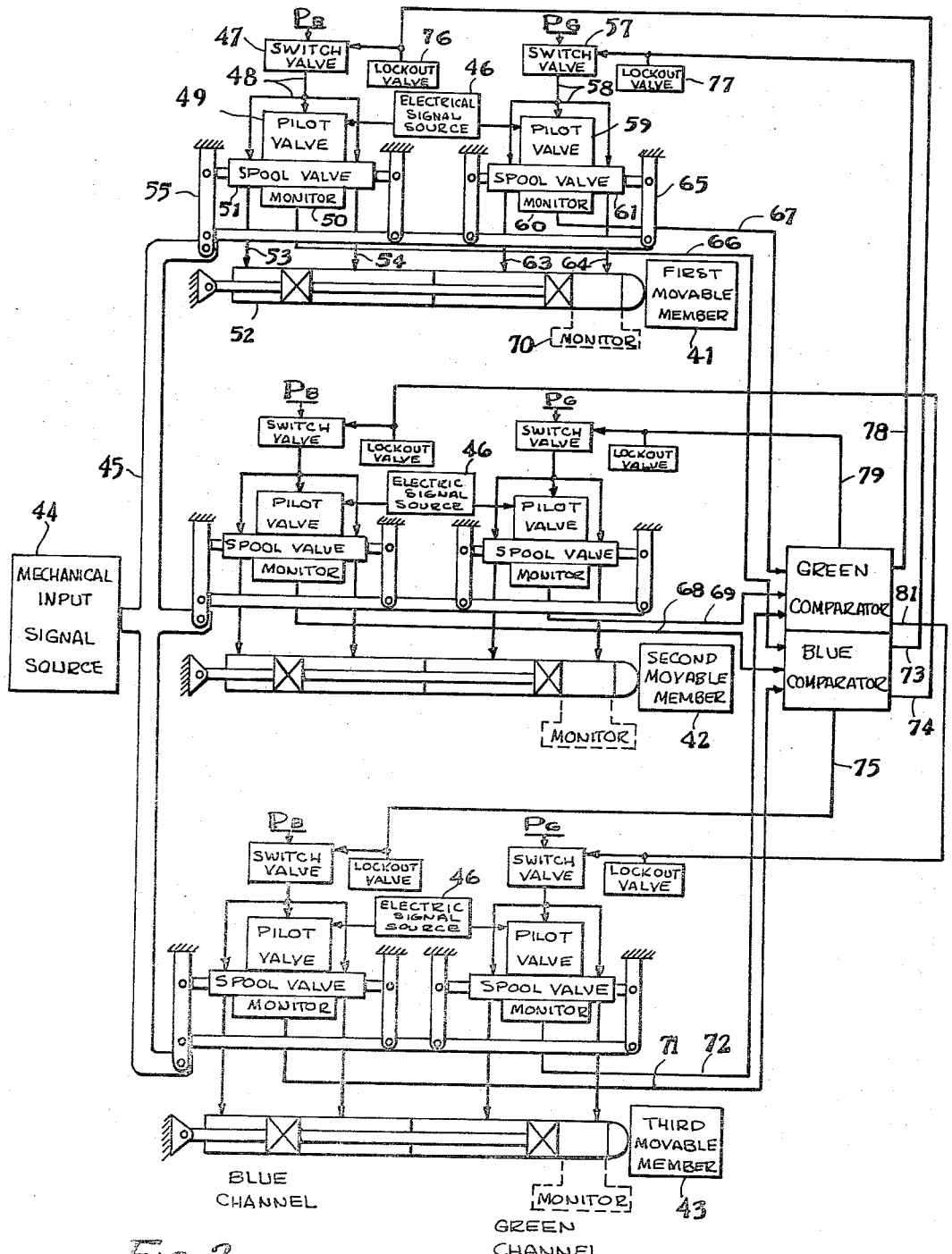

INVENTOR.
DEREK WOOD
ATTORNEYS

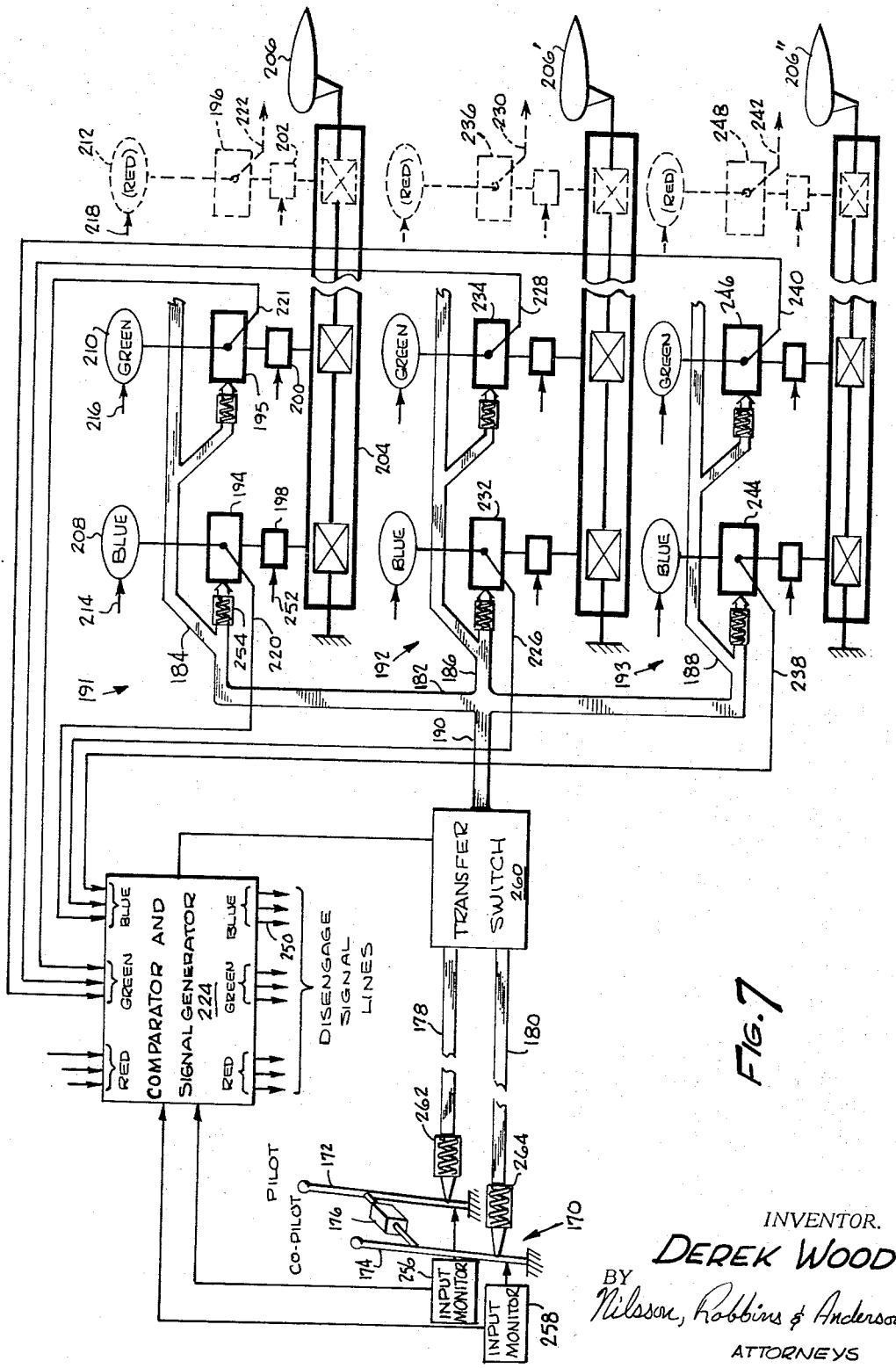

United States Patent Office 3,338,139
Patented Aug. 29, 1967

3,338,139
REDUNDANT CONTROL SYSTEM
Derek Wood, Sun Valley, Calif., assignor to Bell Aerospace Corporation, a corporation of Delaware
Filed Dec. 23, 1965, Ser. No. 515,820
6 Claims. (Cl. 91—411)

This invention relates generally to control systems and more particularly to redundant control systems. The term "redundant control system" as used herein means a control system having more control components or control chains than required to accomplish the desired mission assuming no component, control chain, or system failure. The present invention is adaptable for use in many applications wherein the position of a movable member is to be controlled. At present it is applied to the position control of multiple control surfaces on aircraft and therefore will be described with respect to such an application.

This application is a continuation-in-part of the copending United States application Ser. No. 510,911, filed by Derek Wood on Dec. 1, 1965, entitled Redundant Control System and assigned to the assignee of the present application.

It is presently recognized, when viewing the complexity weight and flight patterns of the present generation of aircraft, that flight control thereof requires the utilization of power to effect proper aircraft control. Such is necessary because of the inherent instability of some of the high-speed aircraft of the supersonic type and because of the weight and large control surfaces embodied in the heavy subsonic type aircraft.

Since power assist becomes necessary under many applications particularly with respect to present day aircraft, it also becomes necessary to detect failures which may occur at any point throughout the control system and to quickly eliminate such failures thereby to preclude damage to the aircraft. In high performance high speed aircraft the pilot is not capable of detecting a failure in the control system and of reacting to such detection fast enough to prevent damage to the aircraft which may result from the failure. Again in such aircraft where multiple control surfaces, as opposed to a single large control surface, are used the pilot is not capable of detecting a failure in one of the multiple surfaces before damage is imparted thereto. A detection and reaction time, including switching the failure out of the control system, on the order of 50 milliseconds or less is required in either case.

Accordingly, it is an object of the present invention to provide a redundant control system for positioning desired members which automatically detects failures within the system and renders the failed portion thereof ineffective to further position the desired members and under certain predetermined operating conditions causes a standby control system to assume position control of the members. Further, such a system upon subsequent failure may automatically switch out the power control and return the same to manual control status or cause the members to move to a neutral position.

It is another object of the present invention to provide a redundant control system for positioning desired members which permanently renders any failed portion of the control system inoperative upon detection of the failure and removal of that failed portion from the system.

It is a further object of the present invention to provide a redundant control system for positioning desired members which monitors the overall operation of the control system and is thereby adapted to detect failures which may occur at any point throughout the system, which failures would have a deleterious effect upon the control of the movable members to be positioned.

It is another object to provide such a redundant, multimode system in which the overall control operation is monitored at the command signal input, the control power output, and desired points therebetween to detect failures which may occur at any point in the system irrespective of its particular mode of operation at any given time.

It is another object to provide such a system in which during a manual, fail-safe mode, the monitoring and failure detection is achieved and the failed component is effectively isolated from the system quickly and without control degradation.

It is another object to provide such a system in which a total redundancy is achieved and may be automatically utilized to provide fail-safe operation, by a plurality of control chains between and even including the pilot, or other operator, and the control surface or other movable member.

It is another object to provide such a system in which during a manual fail-safe mode of control operation, frozen or seized components are automatically isolated from final, power supplying actuators and are effectively decoupled from their manual signal input means.

It is still a further object of the present invention to provide a redundant control system for positioning desired members which is adapted to detect failures which may occur throughout the system and to effect a rendering of the failed portion ineffective sufficiently fast enough to avoid system operation degradation.

Additional objects and advantages of the present invention will become apparent from a consideration of the following description taken in conjunction with the accompanying drawings which are presented by way of example only and are not intended as a limitation upon the scope of the present invention as defined in the appended claims and in which:

FIGURE 2 is a schematic diagram again in block form illustrating a redundant control system in accordance with the present invention as it might be applied to a plurality of control surfaces on an aircraft which control surfaces are to be operated simultaneously;

Figure 6:
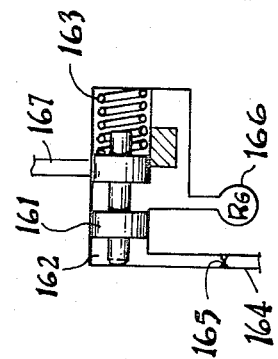

FIGURE 6 illustrates a delay mechanism utilized to prevent error detection functioning of the system at the point when hydraeric fluid is first applied thereto; and FIGURE 7 is a schematic diagram of an alternative example of a hydraeric redundant control system constructed in accordance with the principles of the present invention and partially emphasizing its structure and function during a manual fail-safe mode of control operation.

An example of a redundant control system for positioning movable members as desired in accordance with the present invention includes a plurality of control chains each of which is connected to a particular movable member. Each of the control chains within the system in turn includes a pair, or more, of servo control means which have, in this example, connected thereto, in a one-to-one relation, a like number of sensor means. Switch means in turn is connected to the servo control means and is effective when energized to deactivate a predetermined one of the servo control means. Switch command signal generator means is connected between each of the sensor means and the switch means in the control chains and is adapted to generate a signal for energizing the switch in response to a disparity which might occur between the signals developed within the sensors associated with a respective one of the switch means.

Figure 1:
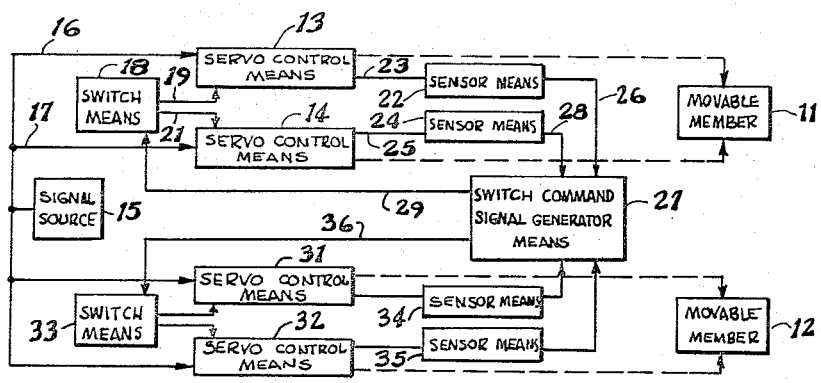
FIGURE 1 is a schematic diagram in block form of a redundant control system in accordance with the present invention.

Referring now to the drawings and more particularly to FIGURE 1 thereof, an example of a system in accordance with the present invention is schematically illustrated. As is therein shown, a pair of movable members 11 and 12 is each connected at the output of a control chain as is illustrated by the dashed lines connected thereto. The movable members 11 and 12 may be any apparatus desired in accordance with any particular application in which a redundant control ssytem might be utilized. The control chain connected to the movable member 11 includes a pair of servo control means 13 and 14. The servo control means 13 and 14 have applied thereto an input signal from signal source 15 by way of leads 16 and 17. The signal supplied to the servo control means may be electrical, mechanical, hydraeric or a combination of such and may emanate from one source and therefore be identical, or from different sources and be similar. The term "hydraeric" as used throughout this specification and claims is defined as being generic to the concept of fluid under pressure and includes both hydraulics and pneumatics.

Switch means 18 is connected by way of lead 19 to servo control means 13 and by way of lead 21 to servo control means 14. A sensor means 22 is connected by way of lead 23 to servo control means 13 while a sensor means 24 is connected by way of lead 25 to servo control means 14. A signal developed by the sensor means 22 is applied by way of lead 26 to a switch command signal generator means 27. The output of the sensor means 24 is applied by way of a lead 28 also to the switch command signal generator means 27. The respective sensor means 22 and 24 are operable in any manner desired in the particular application to ascertain proper operation of the system and may, for example, generate an output signal in response to physical position of an element within the system or a hydraeric or electrical pressure as the case may be.

The control chain connected to the movable member 12 as indicated by the dashed lines includes servo control means 31 and 32, having connected to the input thereof switch means 33. At the output of the servo control means 31 and 32 there is connected a pair of sensor means 34 and 35 respectively. The output of the sensor means 34 and 35 are applied to the switch command signal generator means 27.

In operation of the system as illustrated schematically in FIGURE 1 signals applied from source 15, which as indicated may either be identical signals or similar signals are applied simultaneously to each of the servo control means 13, 14, 31 and 32. Each of the servo control means may be functioning simultaneously to apply positioning force to the movable member connected thereto or one of the servo control means in each chain may be functioning to position the movable member 11 while the other servo control means in each chain is in a standby type configuration; i.e., input signals are applied thereto but no output force is developed thereby. In addition, more than two of the servo control means, such as 13, 14, may be utilized in each channel, and more than the two channels shown may, in typical systems, be utilized in the combination.

In either of the situations above indicated the sensor means 22, 24, 34 and 35 apply their respective signals to the switch command signal generator means 27. Within the switch command signal generator means 27 the output signals developed by like servo control means in each chain are compared to determine disparity which might occur therebetween. For example, the signal developed by the sensor means 22 which is indicative of the operation of the servo control means 13 is compared with the output of the sensor means 34 which is indicative of the operation of the servo control means 31. In the event of a disparity between these signals a switch command signal is generated and is applied to switch means 18 or 33 by way of the leads 29 or 36 respectively depending upon the location of the malfunctioning portion of the control system. In response to the switch command signal either switch means 18 or 33 functions to deactivate servo control means 13 or 31 respectively and causes the control of the position of the movable member 11 or 12 as the case may be to be transferred to the other servo control means 14 or 32 respectively.

It should be expressly understood that a redundant control system in accordance with the present invention may be electrically, electronically, or hydraerically powered or may include a combination thereof as desired in any particular application. For purposes of clarity and ease of illustration and description the system of the present invention will be described hereinafter with respect to a hydraeric control system.

Application of a system as illustrated schematically in FIGURE 1 to a particular apparatus such as an aircraft in which there are a plurality of control surfaces to be positioned in response to input signals is illustrated in FIGURE 2 to which reference is hereby made.

For purposes of description, the first, second and third movable members 41, 42 and 43 respectively may be three portions of a split control surface positioned upon one wing of a high-speed high-performance aircraft and each be controlled by its associated one of three control chains in this example as described below. Further, in this example, it will be noted that each such chain includes a redundant pair of operating control channels. In operation each of the three movable members 41 through 43 would be moved a like amount in response to input signals applied to the control apparatus. A similar system would be used on the other wing of the aircraft and also the remaining control surfaces.

Such input signals may emanate from a mechanical input signal source such as that as shown at 44 and, for example, would be the inputs from the pilot's or co-pilot's control pedestal applied by way of a mechanical linkage 45 simultaneously to each of the control chains connected respectively to the movable members 41 through 43. Alternatively or simultaneously, input signals could be applied to each of the control chains from an electrical signal source shown at 46. The input signals from the electrical signal source may be identical or substantially similar depending upon the particular source thereof.

As illustrated in FIGURE 2, each of the control chains connected to the first, second and third movable members respectively is substantially identical in structure. Therefore, only one of the control chains will be described in detail, it being understood that each of the two remaining control chains contains similar components and operate in a similar manner. It should further be noted that each of the control chains includes duplicate control channels. To differentiate between each of the channels within the control chains, the designations blue and green have been chosen. Thus the control channel on the left side (as viewed in FIGURE 2) of each of the control chains is designated as the blue channel and the channel on the right, the green channel. As indicated earlier, additional channels may be utilized so that each chain includes, for example, a "red" channel or a plurality of other redundant, cooperating channels each coupled to a respective movable member.

Referring now to the uppermost (as viewed in FIGURE 2) of the control chains, it is seen that a source of hydraeric fluid $P_B$ (Blue) is applied to a switch valve 47 of the blue channel. The pressure is fed through the switch valve 47 by way of conduit 48 to a pilot valve 49 and to a spool valve 51. The pilot valve 49 in part controls the position of the spool valve in response to electrical signals applied to the pilot valve from the source 46 thereof. Movement of the spool valve 51 in turn controls the application of the hydraeric fluid to the actuator 52 through the conduits 53 and 54. The operation of the pilot valve, spool valve and actuator is well known in the prior art (see Patents 2,947,285 and 2,947,286) and a detailed description thereof is not deemed to be necessary. Mechanical input signals from the source 44 thereof are also applied to opposite ends of the spool valve by means of the mechanical linkage 55. As is also well known in the prior art, these mechanical input signals also affect flow of fluid through the conduits 53 and 54 to the actuator 52.

A source of hydraeric fluid $P_G$ (Green) is applied to the green channel by way of a switch valve 57. The source of pressure is then applied through the conduit 58 to a pilot valve 59 and to a spool valve 61. Again movement of the spool valve is controlled by the pilot valve 59 which in turn receives electrical input signals from the source 46 thereof and is responsive thereto. Movement of the spool valve in turn controls the flow of fluid through the conduits 63 and 64 to the actuator 52. Mechanical input signals are applied to the spool valve through the mechanical linkage mechanism 65 which is adapted to apply the identical signal to the spool valve 61 as is applied to the spool valve 51.

Monitor apparatus 50 is affixed to the spool valve 51 and produces an output signal which is indicative of the position of the spool valve at any point. This output signal is applied by way of lead 66 as an input signal to the blue comparator.

Monitor apparatus 60 is connected in a similar manner to the spool valve 61 and produces an output signal which is indicative of the position of the spool valve at any point. This output signal is applied by way of lead 66 as an input signal to the blue comparator.

Monitor apparatus 60 is connected in a similar manner to the spool valve 61 and produces an output signal which is indicative of the position of the spool valve 61 at any given point. This output signal is applied by way of lead 67 as an input signal to the green comparator.

It should be expressly understood that the monitors 50 and 60 could be affixed to the actuator 52 as is illustrated by the dashed lines 70 and output signals generated thereby would be applied to the blue and green comparators. In this event the output of each of the control channels would be monitored whereas the monitors as illustrated connected to the spool valves monitor the error signals generated within each of the control channels.

The middle control chain, as viewed in FIGURE 2, is identical in structure to the top control chain and monitor signals are generated and applied by way of leads 68 and 69 to the blue and green comparators respectively. The bottom control chain as viewed in FIGURE 2 again is identical to the top control chain as above described and generates monitor signals in a similar manner which are applied by way of leads 71 and 72 to the blue and green comparators respectively.

The blue comparator functions in a manner such that the three input signals from the blue control channels are compared one against the other to detect any disparity therebetween. In the event of a disparity, the blue comparator generates a switch command signal which is applied by way of one or more of the leads 73, 74 or 75 to the top, center or bottom switch valves respectively in the blue control channel. The particular switch valve to which the switch command signal is applied is determined by where the disparity occurs in the three control chains. In the event a disparity is detected and a switching signal is applied, for example, by way of the lead 73 to the switch valve 47, the blue control channel in the top chain is deactivated. Upon such deactivation, a lockout valve 76 is energized which precludes the blue control channel of the top chain from ever becoming active again unless the same is intentionally reactivated by the pilot. A similar lockout valve 77 operates in the same manner in conjunction with the green control channel and is connected to the switch valve 57.

Switch command signals are also generated by the green comparator in a similar manner and are applied by way of leads 78, 79 and 81 to the top, center and bottom control chains. In the event of a disparity in a signal supplied from the monitors in the green control channels of each of the three chains, the switch command signal would be generated and applied to the particular switch valve required pursuant to a determination of wherein the fault occurred in the particular control system.

Figure 3:
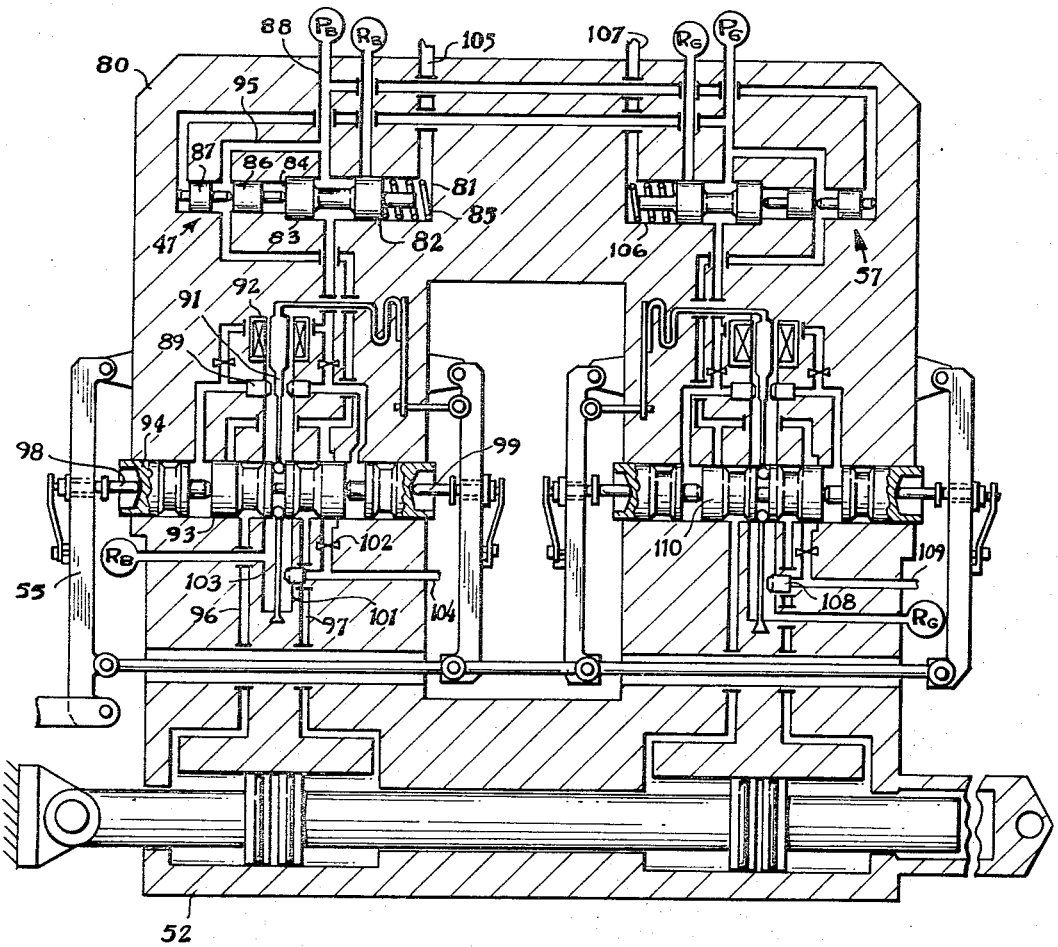
FIGURE 3 is a schematic diagram illustrating the switching and power assist portion of a redundant control system in accordance with the present invention.

The specific elements within a control chain will now be illustrated and described more in detail and reference for that purpose is made to FIGURE 3. As is therein shown, a housing 80 defines a bore 81 within which there is positioned a switch valve 47 which includes a spool valve 82 having a land 83 which abuts a shoulder 84 within the bore 81 and is held in such position (when the system is non-pressurized) by a spring 85. Additional spools 86 and 87 are also positioned within the bore 81 and functions to isolate the blue and green hydraeric sources from each other. As will become more fully apparent below, the spools 82, 86 and 87 function to effect switching by the switch valve 47 in response to errors occurring at various points within the system.

A source of hydraeric fluid indicated at $P_B$ (Blue) is connected by way of conduit or passageway means 88 through the switch valve 47 to a pair of nozzles 89. The pressure at the orifice of the nozzles is controlled by way of a flapper valve 91 the position of which in turn is controlled by a torque motor 92 as is well known in the prior art. An output pressure from the nozzles 89 is applied to opposite ends of a spool valve 93 positioned within a bore 94 in the housing. Hydraeric fluid from the source $P_B$ is also applied by way of a conduit 95 through the spool valve 93, through conduits 96 and 97 to the actuator 52, as is also well known in the prior art. Mechanical input signals are applied to the spool valve 93 through operation of a mechanical linkage at 55 and by way of pins 98 and 99 at opposite sides of the spool valve 93. For an additional and more detailed description of this portion of the servo valve reference is made to U.S. Patent 2,947,285.

Hydraeric fluid from the source $P_B$ is also applied through the conduit 95 to an additional nozzle 101 through a restriction orifice 102. The pressure at the nozzle 101 orifice is controlled by the position of a flapper 103. The position of the flapper 103 in turn is controlled by the position of the spool valve 93. This pressure variation present at the orifice of the nozzle 101 is transmitted through the conduit 104 to the blue comparator and is indicative at all times of the position of the spool valve 93. A conduit 105 is connected between the right side of the bore 81 which houses the switch valve 47 and the blue comparator. The particular relationship between the conduits 104 and 105 and the blue comparator will be described more in detail hereinbelow.

In the right side of the housing 80 there is provided a green control channel which is identical to the blue control channel immediately above described in the left side of the housing 80. Detailed description thereof will not be given. It should, however, be noted that a switch valve 57 identical to the switch valve 47 is provided in a bore 106 which is connected by way of a conduit 107 to the green comparator. It should also similarly be noted that there is also provided a nozzle 108 which is connected by way of a conduit 109 to the green comparator, for purposes of conducting a signal thereto which is indicative of the position of the green spool valve 110 and functions in a manner as described with respect to the nozzle 101 and the flapper 103 which operates in conjunction therewith.

It should be noted that the apparatus as illustrated in FIGURE 3 operates in the so-called force sharing mode of operation; i.e., hydraeric fluid from the source $P_B$ is applied to the left side of the actuator 52 during normal operation while the hydraeric fluid from the source $P_G$ is applied to the right side of the actuator 52 during normal operation. Thus each of the control channels, the blue channel and the green channel, is actively supplying hydraeric fluid to the actuator 52 at all times during normal operation. It should, however, be understood that such is not required and that the green control channel may be inactive during normal operation should such be desired. This could easily be accomplished by proper configurations of the switching valve 57 along with the conduits interconnected therewith to the supply of hydraeric fluid under pressure to the proper areas and to accomplish the required isolation as is well known in the prior art.

Figure 4:
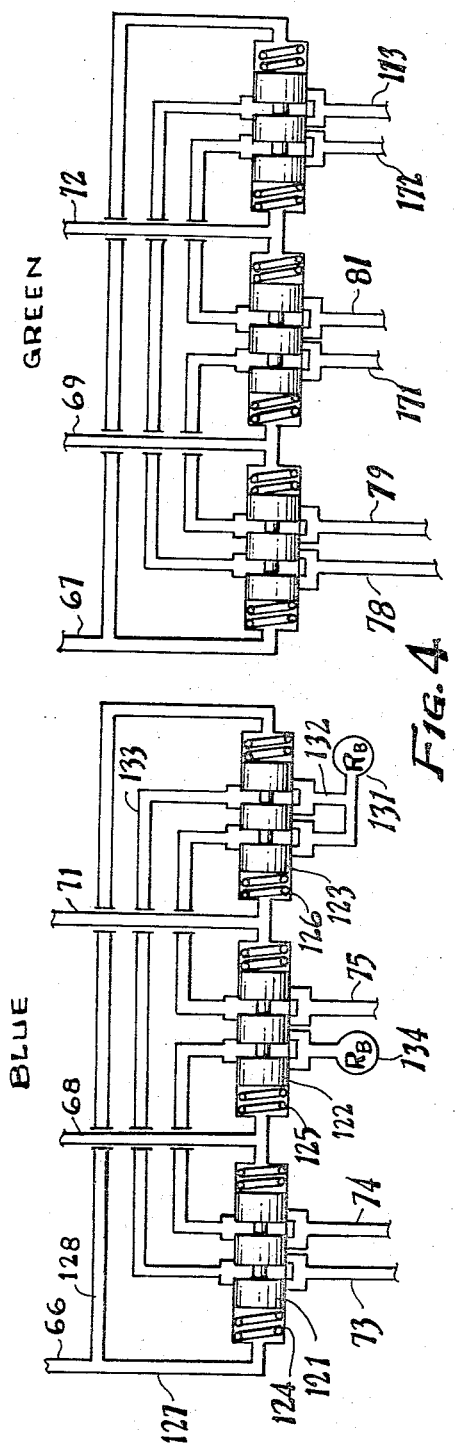
FIGURE 4 illustrates in schematic form the error detection portion of a system in accordance with the present invention.

Referring now more particularly to FIGURE 4, the blue and green comparators are therein illustrated, the blue comparator being on the left and the green comparator on the right. The comparators are substantially identical in structure and therefore the blue comparator will be described in detail with the understanding that the green comparator operates in substantially the same manner but with respect to each of the green control channels within each of the control chains as above defined. For purposes of orientation, the same numbers are utilized for the conduits leading into and out of the blue and green comparators, as illustrated in FIGURE 4, as are used in the schematic diagram of FIGURE 2. As is illustrated, three spool valves 121, 122 and 123 are positioned within cylinders 124, 125 and 126, respectively. Each of the spool valves have identical end areas and are centered within the respective chambers within which they are positioned by springs at each end thereof as illustrated. Conduit 66 which leads from the blue control channel monitor 50 (FIG. 2) branches into conduits 127 and 128. Conduit 127 is connected to the left side of spool valve 121 while conduit 128 is connected to the right side of spool valve 123. Conduit 68 which leads from the center blue control channel (FIG. 2) leads to the right side of spool valve 121 and left side of the spool valve 122. Conduit 71 which leads from the blue control channel at the bottom (FIG. 2) leads to the right side of spool valve 122 and the left side of spool valve 123. Thus it is seen that spool valve 121 is comparing the phase and amplitude between the top and middle blue control channels, spool valve 122 is comparing the phase and amplitude between the middle and bottom blue control channels, and spool valve 123 is comparing the phase and amplitude between the bottom and top blue control channels.

Again for purposes of orientation, the conduits 66, 68 and 71 are similar to conduit 104 in FIGURE 3 while conduits 67, 69 and 72 of the green comparator are similar to conduit 109 of FIGURE 3.

Conduits 73, 74 and 75 are similar to conduit 105 in FIGURE 3 and it should be again noted, with reference to FIGURE 2, that each of these conduits directs a switch command signal from the comparator back to a respective switch valve to effect a deactivation of the particular control channel within which a failure has occurred. This operation will now be described more in detail.

For purposes of description, it will be assumed that a disparity is detected in that the signal generated by the monitor 50 (FIG. 2) in the blue control channel at the top is such that the pressure in conduit 66 is higher than the pressure in conduits 68 and 71. Under such operating conditions the pressure on the left side of the spool valve 121 and on the right side of spool valve 123 is higher than the pressure on the opposite sides of these two spool valves. Such being the case, spool valve 121 translates toward the right as viewed in FIGURE 4 and spool valve 123 translates toward the left. When each of these two spool valves so translates, the return for the blue hydraeric pressure source as shown at 131 is connected through conduits 132 and 133 to the conduit 73. Conduit 73 as above indicated is connected to switch valve 47 as is illustrated in FIGURE 3 as conduit 105. As will be more fully explained hereinbelow, conduit 73 in its normally operated position has a source of pressure connected thereto which maintains the spool valve 82 in the position illustrated in FIGURE 3.

Upon the the connection of the return 131 to the bore 81 (FIG. 3), the pressure appearing on the left side of the spool valves 86 and 87 causes the spool valve 82 to translate toward the right. Such translation causes land 83 to shut off the source of hydraeric pressure $P_B$ from the blue control channel.

It is thus seen that two spool valves in the comparator must translate to connect the return to the switch means 47 as above described. Such is necessary in any disparity before switching can occur; e.g., assuming that the disparity exists in the conduit 68, spool valves 121 and 122 must both translate to connect return 134 to the conduit 74, thus effecting switching by activating a switch valve in the blue control channel of the center chain (FIG. 2). Similarly, the spool valves 122 and 123 must each translate to connect the source of return 131 to the conduit 75 which activates the switch valve in the blue control channel of the bottom chain as shown in FIGURE 2.

Figure 5:
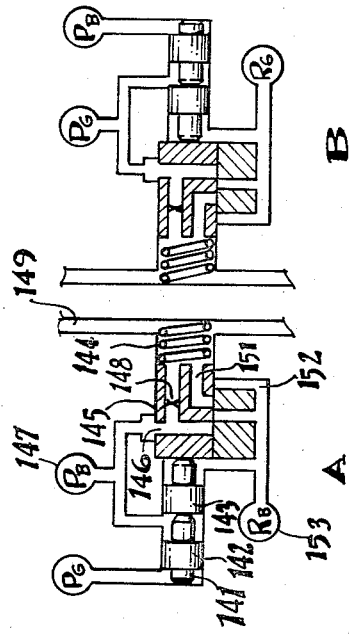
FIGURE 5 illustrates a lockout valve for rendering a switching operation, upon failure of a portion of the system, irreversible.

Referring now more particularly to FIGURE 5 the lockout valve is illustrated in detail. The lockout valve as used in the blue control chains is illustrated at A and the lockout valve as used in the green control chains is illustrated at B of FIGURE 5. With the exception of the application of the particular sources of pressure it should be noted that the lockout valves used in the blue and the green control channels are the same. As is illustrated, positioned within a bore 141 are a pair of spool valves 142 and 143. Positioned within an enlarged section 144 of the bore 141 is an orifice piston 145. In the normal operating position, the orifice piston has a passageway 146 communicating with source of hydraeric fluid $P_B$ as shown at 147 which through a restriction orifice 148 applies pressure to the bore 144 and to the conduit 149. Conduit 149 for purposes of orientation, is connected, for example, to conduits or leads 73, 74 and 75 in each of the blue control channels as shown in FIGURE 2 and which are as above indicated the counterpart of the conduit 105 as shown in FIGURE 3. Thus, the pressure existent in the conduit 149 supplies the normal pressure maintaining the spool valve 82 (FIG. 3) in the position illustrated in the absence of a failure.

In the event of a variance of the output signals of the monitors thus causing the spool valves in the blue comparator to translate connecting the return to the switch valve as above described, it should be noted that return is then connected to the conduit 149 of the lockout valve as illustrated in FIGURE 5. Under these conditions the pressure appearing on the left face of spool valves 142 and 143 drive the orifice piston 145 toward the right as viewed in FIGURE 5. Being driven toward the right, the passageway 151 communicates with the conduit 152 which is connected to return for the blue source of hydraeric fluid as shown at 153. Thus, the conduit 149 is connected permanently into the return which in turn permanently connects the switch valve 47 into return precluding its reactivation should the reason for the initial failure be momentarily corrected. Similar operation occurs with respect to the lockout valve illustrated at B which is connected to conduit 78, 79 and 81 as illustrated in FIGURE 2 and FIGURE 4, and it is thought that a further detailed description thereof is not needed at this point.

Under the circumstances wherein the control system in accordance with the present invention is being operated such that the blue channel in each chain is actively controlling the actuator and the green channel in each chain is in a standby situation, i.e., no hydraeric fluid is being applied to the actuator through control of the spool valve and further an error occurs such that the blue control channel is deactivated and the green control channel is activated and before the hydraeric pressure therein is fully up and equalized with respect to each of the channels. It is therefore necessary to present a predetermined delay to preclude the green control comparator switching out the green control channel before equalization of the pressure occurs. Such a delay device is illustrated in FIGURE 6 and as shown includes a spool valve 161 positioned within a bore 162 and held toward the left by a spring 163. Hydraeric pressure is connected through conduits 164 and a restriction orifice 165 to the left side of the spool valve 161. As the pressure builds up against the left face of the spool valve 161 the force of the spring 163 is overcome at a predetermined point causing the spool valve to translate toward the right as illustrated in FIGURE 6. When such is done, return 166 is connected to conduit 167. Conduit 167 in turn is the counterpart of the returns 131 and 134 shown in the blue comparator and is connected in the green comparator to conduits 171, 172 and 173. Thus, even though there might be translation of the spool valves in the green comparator there would be no possibility of connecting the return to the switch valve means in the green control channels until such a time as the controlled delay by translation of the piston 161 had taken effect.

Referring to FIGURE 7, the example of the invention there shown in a simplified schematic form may be considered to be a portion of an aircraft control system powered by hydraeric fluid. In this particular example, a pilot's command control station 170 including a pair of control columns 172, 174 which are interconnected by a disengageable lock mechanism 176 and which are connected through elongated control cables 178, 180, respectively, to a mechanical linkage network 182. The linkage includes, in the particular example shown, three branches 184, 186, 188 each of which may be considered as being rigidly connected to the central, input arm 190. Each branch transmits the mechanical input signal to all of the output servo valves in its associated control chain 191, 192 or 193. For example, the mechanical linkage branch 184 is coupled to the "Blue" channel output servo spool valve 194, to the "Green" channel output spool valve 195, and to the like element 196 of the "Red" channel. It is to be noted that the control chain fed by the linkage branch 184 may comprise any number of channels, as pointed out earlier. The number may be two, as considered for the examples of the earlier figures whereby one operator on a standby basis, or a larger number such as the three suggested here may all be functioning at all times or one or more may be standby in nature.

Regardless of the number of channels in each control chain, the number being flexible, depending on the system needs and specifications, as indicated by the dashed lines with which the "Red" channel is presented, all channels of a particular chain, in this example, essentially terminate in a servo valve such as 194. Each of these servo spool valves are then coupled, through a respective engage valve to an actuator. In the case of the branch 184, the servo valves 192, 194, 196 are each connected through engage valves 198, 200, 202, respectively, to an actuator 204 which is in turn coupled to a control surface 206 as indicated.

The remaining portions of each channel in the chain has been simplified in FIGURE 7 and may be designated as a hydraeric amplifier 208, 210, 212, respectively, as shown, with its electrical, or other, signal inputs being designated 214, 216, 218 respectively. This simplification along with many others is made in the cause of presenting what is believed to be the clearest and most readily understood description of certain principles of the invention. To the same end elementary and obvious elements or components described in detail earlier are omitted from this figure. Similarly it should be noted and realized at this point that the mechanical and manual aspects of this example are being emphasized and that the electrical, or other, signals and controls are either omitted or minimized for the purposes of illustrating how the system provides redundant control even in the fail-safe mode when a number of other signal amplifier failures have occurred, there has been a large scale power failure or hydraeric fluid loss, or for other reasons the pilots have elected to fly in the manual mode. Accordingly, there will, in connection with the discussion concerning FIGURE 7, be no discussion of control other than in the manual mode. Very briefly, the purpose here is to illustrate the monitoring failure detection, and redundancy transferring even after operation has been switched to manual. It may therefore be considered, for purposes of this description, that one or more failures has occurred in the hydraeric amplifiers, or in the signal networks precedent thereto, and that they are therefore not effectively in the control system, having been disengaged therefrom by methods and structures described earlier herein.

It should further be noted that, as in the previous figures, the different control chains are substantially identical and need not therefore each be described in complete detail.

Continuing with the description of FIGURE 7, the operational status of each of the spools of the servo valves of each of the control chains 191, 192, 193 is continuously monitored by signal lines 220, 221, 222 connected between the servo valves 194, 195, 196 and a hydrologic comparator and a switching control signal generator network 224; by signal lines 226, 228, 230 connected between the servo valves 232, 234, 236 of the chain 192 and the comparator network 224; and by signal lines 238, 240, 242 connected between the servo valves 244, 246, 248 of the control chain 193.

Thusly, in effect, the condition and hence operation of each output of the system is monitored and compared; and any discrepancy in the operation of any spool valve causes a signal to be generated in the logic network 224 and transmitted to the engage between that spool valve and its power actuator; for example, if the spool of the servo valve 194 suffered a seizure, its monitor signal on the line 220 would suddenly fail to share the predetermined coincidence with the other spool valves with which it was being compared. The logic network would then issue a disengage signal from its terminal 250 which is connected to the input terminal 252 of the engage valve 198 and the latter is switched to isolate the servo valve 194 from its actuator 204. In this manner, the seized valve 194 does not impede the operation of the actuator 204.

Furthermore, the seized valve does not impede the linkage 184 because the coupling therebetween is a spring connection 254 as indicated. Each of the servo valves are similarly connected to their respective command linkages with a spring coupling component which permits the pilot to override the failed or deactivated servo valve without degrading the control operation.

It is to be noted with respect to the comparator network 224 that each of nine disengage signal lines is connected to a respective one of the nine engage valves shown in the example of FIGURE 7.

From the description thus far presented of the example of FIGURE 7, it is clear that throughout the level of the nine servo valves and their connections with their respective actuators, a complete redundancy is achieved in cooperation with the logic of the network 224; this could be termed a "horizontal" redundancy. A further feature of the invention to be described, however, is its capability of what may be termed a "vertical" redundancy by which not only the system power outputs are compared and made redundant among themselves but are also compared with the manual input signal for further control intelligence and versatility. This type of a more complex redundancy is, in a general sense, somewhat analogous to brain redundancy and, as an approach philosophy for control systems, shares some of the same advantages.

To this end each of the control columns 170, 172 is provided with a position monitoring sensor circuit 256, 258, respectively, the output signal from which is coupled to the hydrologic network 224 so that the position of the columns as an input signal may be compared with those at the output end of the system. This provides intelligence to resolve a failure of the character in which all monitored servo valves are in phase and amplitude coincidence and yet control is not being achieved. The failure may well be, therefore, between the input arm 190 of the branch network linkage and the command station 170. In particular the failure may be a seized or parted cable somewhere in the great length of the cables 178, 180.

The redundant cables 178, 180 are normally alternatively coupled to linkage common arm 190 by a transfer switch 260. The switch, or clutch, 260 may also couple the arm 190 to both of the cables 178, 180; but in either mode if the input signals do not share the prescribed coincidence with the output signals from the monitored servo valves, the transfer switch transfers control either to the opposite cable, or, if both are being used, first to one and if it is the failed one, then to the other so that, substantially immediately, manual control is reinitiated.

In order that the pilots may override the failed cable, particularly in the event that the control columns interlocking mechanism 176 has not been disengaged or the pilots have not learned which of their respective cables have failed, the coupling between stick and cable in each case is effectively spring loaded as indicated by the spring couplers 262, 264.

Clearly additional redundancy can be added to the cable network between the linkage arm 190 and the command station 170; however, it is considered that with the simple dual chain shown, the structural concepts of the invention have been presented and explained adequately and as concisely as possible.

There has thus been disclosed a redundant control system which achieves the objects and exhibits the advantages set forth hereinabove and, in particular, which automatically detects failures within the control system and automatically renders the failed portion thereof ineffective and does so quickly enough to avoid system operation degradation and after such detection locks out the failed portion of the control system. Although a control system in accordance with the present invention has been illustrated in some detail and described accordingly in the specification and drawings, such is to be taken as an example of an operative system and is not to be taken as a limitation upon the scope of the claims appended hereto.

What is claimed is:

1. Redundant hydraeric control system for transmitting command function signals from an input station to a plurality of movable members comprising:

(A) a plurality of hydraerically powered control chains each including an output actuator force coupled to a respective one of said movable members, each of said control chains including a plurality of control channels having mechanical input signal receiving means and having a servo output means coupled to the actuator of its respective control chain and including engage valve means intercoupled therebetween responsive to engage-disengage signals impressed thereupon to couple and decouple, respectively, said servo means from its said actuator means, each of said servo output means having operational status signal generating means for providing a monitor signal representative of the operational status of the servo means;

(B) mechanical common signal input means coupled to each said servo valve signal receiving means;

(C) mechanical input command signal generating means disposed at said input station;

(D) input signal coupling means for force coupling said input command signal generating means to said common signal input means;

(E) monitor signal comparator and signal generator logic network coupled to said operational status signal generating means of each said servo output means and to each said engage valve means for comparing said monitor signals and detecting, by any predetermined lack of coincidence therebetween, a failed channel within one of said control chains and for generating a disengage signal and impressing it on the said engage valve means interconnecting that failed channel to its respective said actuator for decoupling the servo valve output means of that channel from its said actuator thereby to permit freedom of motion of the actuator with respect to the last said servo valve output means; and (F) override coupler means interposed between said mechanical common signal input means and each said servo valve means for providing override capability over any failed mechanical component element thereof.

2. The invention according to claim 1 which further includes input signal monitoring means coupled to said mechanical input command signal generating means and to said logic network for providing monitor output signals indicative of the desired system input signals; and in which said logic network is further adapted to compare for coincidence between said operational status monitor signals generated by said output servo means and said monitor output of said input signal monitoring means and for generating said disengage signal in response to a predetermined lack of coincidence between said monitor signals including those of said input signal monitoring means.

3. The invention according to claim 2 which further includes transfer switch means having switching signal input means coupled to said logic network and having a mechanical output terminal connected to said mechanical common signal input means and a plurality of input terminals and being of the character to connect selected at least ones of said input terminals to its said output terminal in response to switching signals impressed on said switching signal input means from said logic network.

4. The invention according to claim 3 which further includes a plurality of elongate mechanical control chain means interconnected between different ones of said input terminals of said transfer switch means and said mechanical input command signal generating means; and in which said logic network is of the character to provide said switching signals responsive to predetermined lack of coincidence between said monitor signals from said output servos and said monitor signals from said input signal monitoring means.

5. The invention according to claim 4 in which said mechanical input command signal generating means includes a pair of air frame control columns, said input signal monitoring means includes a pair of column position sensing signal generators each coupled to said logic network, and said plurality of elongate mechanical control chain means comprises a pair of control cables, individual ones of which are connected between one of said control columns and a respective one of said input terminals of said transfer switch means.

6. The invention according to claim 5 which further includes mechanical locking means interconnecting said columns and mechanical override means interconnected in each of said control cables whereby a faulty one of said cables does not preclude the control function of at least one of said control columns.

References Cited

UNITED STATES PATENTS

| | | | |
|---|---|---|---|
| 3,124,041 | 3/1964 | McMurtry et al. | 91—1 |
| 3,149,272 | 9/1964 | Dendy | 244—77 |
| 3,270,623 | 9/1966 | Garnjost et al. | 91—387 |

EDGAR W. GEOGHEGAN, *Primary Examiner.*